Nov. 5, 1940.  K. B. BLODGETT  2,220,861
REDUCTION OF SURFACE REFLECTION
Filed June 16, 1938

Inventor:
Katharine B. Blodgett,
by Harry E. Dunham
Her Attorney

Patented Nov. 5, 1940

2,220,861

UNITED STATES PATENT OFFICE 2,220,861

REDUCTION OF SURFACE REFLECTION

Katharine B. Blodgett, Schenectady, N. Y., assignor to General Electric Company, a corporation of New York Application June 16, 1938, Serial No. 214,175

7 Claims. (Cl. 88—1)

The present invention relates to the reduction of surface reflection from transparent bodies.

The occurrence of substantial specular reflection from the surfaces of bodies intended to be light-transmitting is obviously objectionable. In some cases, as with a viewing window, the objectionable feature consists in the existence of glare which lessens the apparent transparency of the window by obscuring the vision of the observer. In other cases, as with a lens or prism system, the important factors comprise reduction in transmitted light due to loss of the reflected component and the formation of secondary or "ghost" images by such component. In some situations, all these factors are involved.

It is possible to reduce specular reflection from a given body by providing the body with a matte or diffusing surface. However, this and similar expedients heretofore employed are effective only at the cost of producing scattering of light at the surface of the body and are, therefore, inapplicable in cases where transparency and avoidance of scattering are primary considerations.

It is an object of my present invention to reduce surface reflection from transparent bodies by means which simultaneously increases the light transmission therethrough. This is accomplished, as will be further explained in the following, by providing the body in question with a superficial coating or layer having appropriate dimensional and optical properties. The invention is capable of very wide application, and may advantageously be employed in connection with any transparent object or body, regardless of character or size, which possesses utility by virtue of its ability to transmit light.

Figure 4:
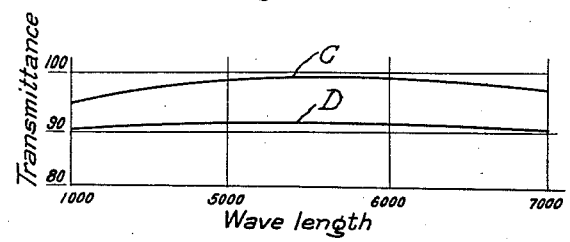
Figure 2:
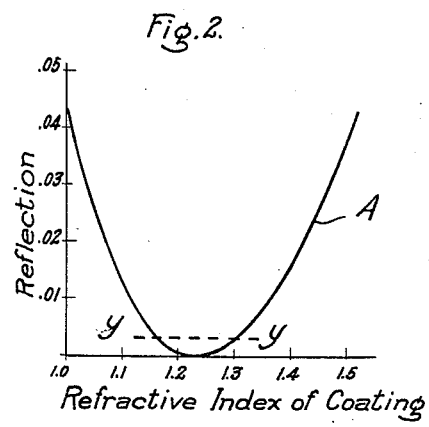
Figure 5:
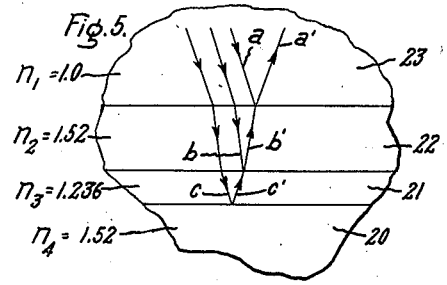
Figure 6:
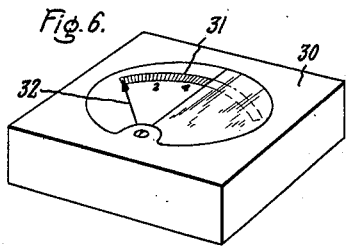
Figure 7:
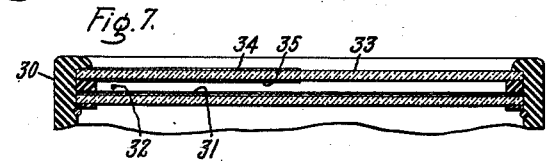
Figure 3:
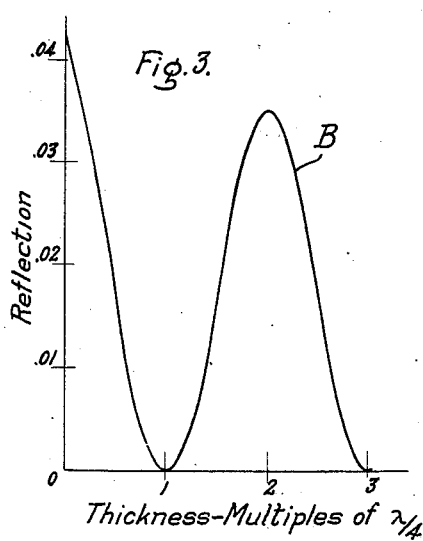
Figure 8:
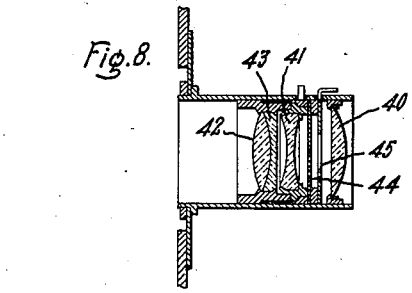

The novel features which I desire to protect herein are pointed out in the appended claims. The invention itself may best be understood by reference to the following description taken in connection with the drawings in which Fig. 1 comprises a diagrammatic representation of the interference effects obtained when light rays are reflected from multiple surfaces; Fig. 2 is a graph showing the relationship between the refractive index of a reflection-reducing coating applied to a given surface and the amount of reflection from that surface; Fig. 3 is another graph showing the variations in amount of reflection with the thickness of a reflection-reducing coating; Fig. 4 is still another graph showing the relation between wave length of light and the amount of light transmitted through a partially reflecting surface; Fig. 5 is a diagrammatic representation showing the mechanism of light interference for light reflected from a number of contiguous transparent bodies; Figs. 6 and 7 are different views of an indicating instrument suitably embodying my invention; and Fig. 8 is a sectional view of a lens system embodying the invention.

Before proceeding to a detailed description of my invention, it will be helpful to refer briefly to some of the theoretical considerations involved. It is a known principle of optics that a certain amount of light will necessarily be reflected at a boundary between two non-absorbing (transparent) media having different refractive powers. Assuming two contiguous media whose refractive indices are respectively $n_1$ and $n_2$ and which are illuminated by light at perpendicular incidence, the amplitude of the reflected light will be a fraction $$\frac{n_1 - n_2}{n_1 + n_2}$$

of the amplitude of the incident light. In the case of a sheet of glass having a refractive index of the order of 1.52, the intensity (i. e. the square of the amplitude) of the light reflected from each of the air-glass interfaces will be approximately 4.25% of the incident intensity, the total reflection from both faces thus being about 8.5%. In a lens system or the like, this reflection is important and objectionable from the standpoint of the loss of light which it entails. In connection with a viewing window, on the other hand, the reflected light produces "glare" or other vision-obscuring effects and reduces the visibility of objects on the other side of the window.

In accordance with my present invention, these undesirable effects may be substantially reduced by applying to the transparent body a superficial coating having appropriate physical characteristics. In the first place, it is necessary that the refractive power of the applied coating be properly related to that of the transparent body and to that of the medium in which the body is situated. In the second place the thickness of the coating should bear a critical relationship to the wave length of light.

Figure 1:
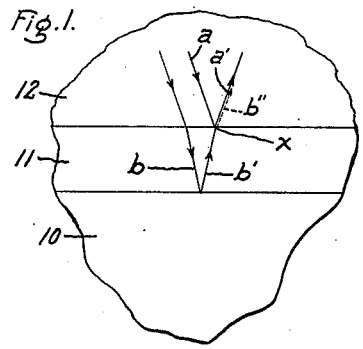

The principles involved may best be explained by referring to Fig. 1 in which is shown a fragmentary section 10 of a non-absorbing body (refractive index $n_3$) having applied thereto a surface layer 11 of a second non-absorbing substance having a refractive index $n_2$. The layer 11 is in contact with a third medium 12, for example, air, which has a refractive index $n_1$. It is assumed that the optical thickness of the layer corresponds at least approximately to a quarter wave length of visible light and that its refractive index is intermediate between that of the medium 12 and that of the transparent body 10.

Under these conditions a light ray $a$ impinging on the layer 11 at nearly perpendicular incidence suffers reflection of a component $a'$ whose amplitude is a fraction $$\frac{n_1-n_2}{n_1+n_2}$$

of the amplitude of the incident ray. Similarly, another ray $b$ which has penetrated the layer 11 and reached the interface between that layer and the member 10 experiences reflection of component $b'$ whose amplitude is a fraction $$\frac{n_2-n_3}{n_2+n_3}$$

of that of the ray $b$. Due to the greater path length traversed by the ray $bb'$ (one-half wave length if the optical thickness of the layer 11 is one-quarter wave length), it arrives at the point X, 180° out of phase with the reflected ray $a'$. Consequently an interference effect occurs, and the amplitude of the ray $a'$ is reduced by the portion $b''$ of the ray $b'$ which tends to leave the upper surface of the layer 11 at the point X. Additional reduction of the ray $a'$ is effected by multiple reflection within the layer 11 of other rays similar to $b$, which tend to issue at the point X. Taking all these effects into consideration, it is found that the resultant reflected ray is of zero amplitude when the refractive index $n_2$ of the layer 11 has a value which is the geometrical mean of the refractive index $n_1$ of the medium 12 and the index $n_3$ of the member 10.

Furthermore, since both the body and the layer are assumed to be constituted of media which do not absorb light, all the light except that which leaves the upper surface of the layer 11 must be transmitted through the layer and the body 10. It will be apparent, therefore, that the addition of the layer 11 simultaneously decreases reflection from and increases transmission through the body 10.

The significance of the foregoing may be better understood by referring to a particular example such as is provided if we assume that the body 10 is constituted of glass and that the medium 12 is air. If the refractive index of the glass is 1.52, that of the layer 11 should be 1.233 for optimum results for light at normal incidence.

The results described in the foregoing will still obtain, though in varying degree, for any value of refractive index of the layer 11 which is intermediate between that of the body 10 and that of the medium 12. The nature of the variations which occur in the reflection from a coated glass surface when the refractive index of the coating substance is varied is shown by curve A of Fig. 2. This figure refers to the case where the thickness of the coating is one-quarter wave length of visible light.

It will be observed that the reflection decreases rapidly as the refractive index of the coating layer is raised above that of air or is decreased below that of the glass. Consequently the use of a layer of the type specified having any intermediate value of refractive index results in a substantial improvement in light transmittance. From the standpoint of glare reduction, the characteristics of the human eye are such that only relatively great changes are significant. It is, therefore, true that from this particular viewpoint the region below the line $y$—$y$ is of greatest importance. Within this region the refractive index of the layer 10 may be said to approximate the geometric mean between that of air and that of glass.

For a fixed value of refractive index the thickness of the layer 11 may also be varied substantially without destroying the beneficial effects referred to. The results of such variation are indicated by the curve B of Fig. 3, which shows the intensity of reflected light as a function of the optical thickness of the layer. ("Optical thickness" comprises true thickness multiplied by the refractive index of the medium.) In this case thickness is expressed in multiples of a quarter wave length of visible light.

It will be noted that reflection of light is a minimum when the optical thickness of the layer corresponds to one-quarter wave length ($\lambda/4$) of visible light. Maximum reflection occurs when the thickness of the film is zero and again when the thickness corresponds to two-quarter wave lengths. If the thickness is still further increased, additional maxima and minima will occur as odd and even multiples of a quarter wave length are reached; however, for reasons now to be explained it is preferred to employ a film thickness on the order of one-quarter wave length rather than an odd multiple thereof.

In this connection it should be pointed out that the phrase "wave length of visible light" is a term of considerable latitude since visible light is constituted of components varying in wave length from about 4,000 to 7,000 Angstrom units. It is obvious, therefore, that a thickness which corresponds to a quarter wave length for some particular component of visible light will not so correspond for any other component. This factor is not of great importance, however, if the thickness of the layer 11 is selected to correspond to a single quarter wave length of some component of visible light near the center of the visible spectrum. The component preferably chosen for most uses is that for which the sensitivity of the eye is greatest, this condition being fulfilled by light having a wave length of approximately 5,500 Angstrom units. For certain other uses, however, as in photographic systems, it may be desirable to select some other thickness appropriate to the sensitivity of the film or recording agent to be employed. In systems involving the transmission of non-visible radiations such as ultra-violet light, the thickness of the coating to be applied to the transmitting medium (e. g. quartz) is determined by the wave length of the particular radiation in question.

If the thickness of the layer 11 is chosen to correspond optically to a quarter wave length of the selected light component, reflection of perpendicularly incident light may be made zero for a single-surfaced system and substantially zero for a system where more than one surface is traversed by the light. Furthermore, reflection of the other components may be very small. This fact is denoted by the curve C of Fig. 4 which is based on observations of the light transmittance at various wave lengths of a glass body having both its outer surfaces coated with a non-absorbing layer having an optical thickness of about 1,375 Angstrom units (i. e. one-quarter of 5,500 units) and a refractive index of approximately 1.22. Curve D comprises the transmittance characteristic of uncoated glass. It will be seen that for the coated element the loss due to reflection is very small at the central portion of the curve and increases only slightly adjacent to the extremities of the visible band. It will be understood also that reflection at the higher and lower wave lengths is of relatively less importance because of the diminishing sensitivity of the eye in these regions.

If the thickness of the layer 11 is increased to three or more odd numbers of quarter wave lengths, its effectiveness in suppressing reflection of the selected component remains substantially unchanged. However, reflection of the other components will be considerably increased. For this reason it is preferable, as previously stated, to employ a thickness corresponding to a single quarter wave length.

What has been said in the foregoing applies with exactness only in the case of normally incident light. However, the relationships mentioned hold approximately for light impinging at any angle greater than, say, 45 degrees. Where it is desired especially to eliminate reflection of light having any given angle of incidence other than normal incidence, this can be done by properly relating the thickness and refractive power of the coating layer to the angle in question in accordance with known optical relationships.

It is not necessary that the reflection reducing coating consist of a single layer or be constituted of a single material. In Fig. 5 there is shown an alternative arrangement in which a principal transparent body 20 is coated successively with two superimposed non-absorbent layers 21 and 22, the outer layer being in contact with an immersion medium 23 such as air. It is assumed that the optical thickness of the layer 21 corresponds to a quarter wave length of some component of visible light and that of the layer 22 to one-half wave length of the same component. For clarity, particular values have been assigned to the refractive indices of the various materials on the drawing, which values correspond approximately to those which would be appropriate if the body 20 has an index of about 1.52.

With the combination shown an incident ray $a$ would tend to suffer reflection of a component $a'$ of amplitude determined by the relationship between the refractive indices $n_1$ and $n_2$. Furthermore, in accordance with known optical principles the reflected component $a'$ experiences a 180 degree reversal of phase. (This phenomenon is a concomitant of reflection where the incident light is in such a direction as to pass from a material of low refractive index to a material of higher index.) A second incident ray $b$ after penetrating the layer 22 suffers a reflection in the interface between the layers 21 and 22. The reflected component $b'$, in returning to the upper surface of the layer 22, traverses a path which is, optically speaking, a full wave length greater than that traversed by the directly reflected ray $a$—$a'$. Consequently due to the 180 deg. reversal of phase experienced by the ray $a'$, an interference effect occurs between such ray and that portion of the ray $b'$ which tends to escape from the upper surface of the layer 22.

Similarly a ray $c$ which penetrates to the upper surface of the body 20 experiences reflection of a component $c'$ of which a part returns to the surface of the layer 22 at a point corresponding to the point of impingement of the ray $a$. Since the ray $c$—$c'$ traverses in total, a path having an optical length equivalent to one and one-half wave lengths and since the ray $c'$ experiences a 180 deg. reversal of phase by virtue of its reflection from the surface of the body 20, it will arrive at the upper surface of the body 22 in such phase as to interfere with the ray $a'$. As a result, the total reflected light leaving the surface of the body 22 will be the difference between the amplitudes of the ray $a'$ and the additive amplitudes of those portions of the rays $b'$ and $c'$ which tend to escape from such surface. By proper choice of the refractive indices of the layers 21 and 22 this remainder may be made equal to zero for a particular wave length of light. This condition is substantially fulfilled by the particular combination illustrated.

From what has been said in the foregoing it will be seen that the condition to be fulfilled for the total elimination of reflection from the surface of a lamina body is that the vectorial summation of the components reflected from the various laminal surfaces must, at the point of issuance from the outer surface of the body, be equal to zero. Obviously, making use of the principles explained above, numerous combinations may be found which meet or approximate this requirement. A further important aspect of my invention consists in the provision and application of certain types of reflection-reducing coatings, and especially in the provision of coating substances suitable for use with transparent bodies having indices of refraction on the order of that of glass. As previously pointed out, such a substance should have a refractive index between that of air and that of glass and preferably between the values of about 1.2 and about 1.3. The substance should also be of such character as neither to absorb nor scatter an appreciable amount of light.

The best value of refractive index for a material to be applied to ordinary glass (index 1.52) is substantially below those which characterize known solid substances. However, a refractive index within the desired range may be realized by the formation of a so-called "skeleton" film of the general type described in my co-pending application Serial No. 196,234, filed March 16, 1938 and further described in an article by K. B. Blodgett and I. Langmuir appearing in the Physical Review, Vol. 51, page 980. As therein explained, skeleton films comprise solid films which are characterized by the presence in their structure of numerous air-filled voids of molecular dimensions.

One method of preparing skeleton films of the character specified is elaborated in the application and article above referred to. This method consists in first forming a solid film comprising two or more separable constituents and thereafter selectively abstracting one of such constituents by a dissolving process to leave a molecular skeleton or lattice.

In order to obtain a film of exactly determinable dimensions and uniform thickness one may employ the method which is described in the article above referred to. This method involves forming on the surface of a base member a film comprising a plurality of "monolayers" successively deposited from the surface of a body of a liquid working medium on which a single layer has been preliminarily developed. (The term "monolayer" as used herein designates a single layer or stratum of atoms or molecules, such layer being characterized by a uniform thickness of molecular magnitude.)

As an example of a particular substance which may be employed in the production of a skeleton film, reference may be had to cadmium arachidate. In dealing with this material a monomolecular layer thereof is formed by spreading arachidic acid on the surface of a body of water including a dissolved cadmium salt. Thereafter a base member (i. e. a transparent body) to be coated is successively raised and lowered through the surface of the film-covered water to deposit at each passage an added monolayer. By continuing to raise and lower the base member, any number of layers or strata may be built up to produce a film of desired thickness. In the case of cadmium arachidate, a film of about forty layers thickness is appropriate.

After its formation the cadmium arachidate film may be "skeletonized" by subjecting the film to a suitable solvent. For example, a cadmium arachidate film which has been built from the surface of a body of water containing a dissolved cadmium salt in a concentration $10^{-4}$ molar and having pH=5.7 comprises about 50% cadmium arachidate and 50% arachidic acid. When a film of this type is soaked for about 1 to five minutes in a solvent such as alcohol or acetone and is then withdrawn, the character of the film is substantially altered. This is due to the solution from the film of the arachidic acid component, the cadmium arachidate being left as a skeleton with air filling the spaces previously occupied by the arachidic acid. A film subjected to a procedure such as is outlined in the foregoing is found to have a refractive index of approximately 1.25, this being relatively close to the geometric mean between the refractive index of air and that of a glass of index 1.52. Such a film is also highly uniform as to thickness and is characterized by negligible absorption and scattering of light.

Cadmium arachidate has been mentioned only as an exemplary material and numerous other materials may be substituted therefor. For example, one may use alternatively barium palmitate, calcium stearate, lead arachidate or other soaps of fatty acids. In each case the number of monolayers to be employed will depend upon the particular characteristic of the substance chosen.

An example of another type of material which is useful in the production of "skeletonized" films having refractive powers within the desired range is provided by the substance ethyl silicate. This material, when hydrated and polymerized by being admixed with water and permitted to stand for a substantial period of time, may be spread upon water and then built-up as a multilayer film or may be applied to a glass or other surface by bringing the surface into contact with the mixture. Uniform thickness of deposition may be obtained by withdrawing the base member from the solution at a constant rate.

In order to convert the coating thus obtained into a skeletonized film having appropriate refractive properties the coating may be heated to a relatively high temperature on the order of 500° C. This step eliminates from the coating at least some of the aqueous and hydrocarbon components, leaving a porous molecular structure. The properties of the resultant film are governed by the proportions and extent of polymerization of the original solution and may be varied within relatively wide limits. Since the refractive power of a skeletonized film of the type just described tends to increase somewhat upon exposure to moist air, it is desirable to make the film initially somewhat lower in fractive power than that ultimately desired to be obtained. The refractive properties of the film may be stabilized if desired by applying to the outer surface of the film an extremely thin layer (e. g. a monolayer) of glass or other substance adapted to close the pores of the coating structure.

In Figs. 6 and 7 I have illustrated one example of a possible application of the invention. In the specified figures there is shown an indicating instrument, for example, an electrical ammeter or voltmeter. This comprises a casing 30, a dial face 31 and an indicating needle 32 adapted to move over the face of the dial. In order to protect the needle and dial, both are covered by a transparent viewing window 33 (see Fig. 7).

In reading a meter such as that described, the observer is frequently troubled by glare produced by reflection from the surfaces of the viewing window 33. Such glare makes it difficult to read the meter by dazzling or obscuring the observer's vision. This difficulty may be substantially eliminated through my invention by applying to the inner and outer surfaces of the viewing window, coatings of the character described above. Such coatings are shown in Fig. 7 at 34 and 35, their thickness being greatly exaggerated for purposes of clarity. The use of two coatings (34 and 35) applied as shown prevents the occurrence of reflection at either surface of the window 33.

The effectiveness of the invention as applied in this connection is indicated by the appearance of Fig. 6 in which it is assumed that the reflection-reducing coating has been applied only to the left hand portion of the viewing window. It will be seen that the uncoated portion to the right of the line 36 gives the impression of being only partially transparent. This is an effect which is observed particularly if the meter is viewed in a strong light adapted to produce glare. The coated portion of the viewing window, however, appears perfectly clear and free from glare.

It is obvious that the utility of the invention is in no way limited to a metering instrument of the character illustrated in the drawing. On the contrary, it may be applied with equal advantage in any situation or arrangement involving the use of a viewing window. Particular examples which may be enumerated comprise watch dials, show windows, showcase windows, picture frame glass, automobile windshields, spectacle lenses, and the like.

In Fig. 8 I have illustrated the application of the invention in a situation where good transmission of light and the avoidance of "ghost" images are of primary importance. In this case there is shown a complex lens systems such as employed in certain photographic cameras. This lens system is of the triplet type and comprises a plano-convex element 40, a biconcave element 41 and an achromatic combination involving elements 42 and 43. Of these the former is biconvex and the latter plano-concave. They are constituted of glasses of different refractive powers so as to facilitate the elimination of chromatic aberration. A shutter 44 and a diaphragm 45 are provided between the lens elements 40 and 41.

It will be noted that the lens system described above embodies six glass-to-air surfaces at which reflection can occur. Assuming that a loss of light on the order of 4% occurs by reflection at each of these faces, the total light loss may obviously be so great as seriously to impair the utility of the system. Furthermore, the presence of so many sharply curved lens surfaces facilitates the production of secondary or "ghost" images which tend to lessen the clarity of a photograph taken with the camera.

Both the difficulties referred to in the foregoing are overcome by applying the reflection-reducing coatings of my invention to the various exposed surfaces of the lens elements. Such coatings may comprise cadmium arachidate films of the type described in the foregoing or other non-absorbent films having an appropriate refractive power and thickness. Due to the relatively high refractive powers of the crown and flint glasses employed in lenses of the type specified, a suitable index of refraction for the coating layer may be on the order of 1.3 or slightly less.

It will be noted that the lens elements 42 and 43 are shown as being fitted to one another. In accordance with prevalent practice they would also be carefully shaped to fit one another and joined by a suitable cement in order to reduce the number of glass-to-air surfaces present. The necessity for this practice, which is objectionable because expensive, and because of the restriction imposed upon the lens design, is overcome by my present invention, since coating the lens surfaces in the manner specified automatically eliminates the objections to the existence of air-glass surfaces. The coated lens elements may have curvatures which are different for the two lenses and may be spaced to any desired extent which is consistent with obtaining the desired optical effects.

From the foregoing discussion of my invention as applied to a camera it will be readily understood that it has equivalent utility in connection with many other optical devices such as telescopes, binoculars, microscopes, spectrographic apparatus and other laboratory instruments. In many of these devices the occurrence of reflection imposes the main limitation on sensitivity. Consequently, the removal of this factor by utilization of my invention will make possible a general advance in the optical arts.

In connection with the elimination of secondary images it may also be noted that such images are experienced in the use of mirrors of the type which employ a glass plate coated on one surface with a deposit of silver or the like. In this connection also these images may be eliminated by applying a reflection-reducing coating to the glass surface nearer the observer.

While glass has been specifically referred to in the foregoing as a typical transparent substance, it will be understood that the invention is equally applicable in connection with other substances which possess utility by virtue of their ability to transmit light. One may mention as examples, transparent wrapping tissues, such as sheets of regenerated cellulose, transparent synthetic plastics, such as methyl methacrylate, and transparent mineral substances, such as quartz.

Where the term "light" is employed herein, it is intended to include not only visible light, but also ultra-visible radiations having characteristics similar to those of visible light.

What I claim as new and desire to secure by Letters Patent of the United States, is:

1. In combination, a transparent body adapted to be used in a situation where reflection of light from the surface of the body is undesirable, and a thin transparent coating comprising a plurality of superimposed monolayers on the body, said coating having a thickness corresponding approximately to an odd number of quarter wave lengths of some component of light and there being numerous voids of molecular dimensions in the structure of the coating whereby its refractive index approximates the geometric mean between that of the body and that of air.

2. In combination, a body of glass and a plurality of monolayers on the glass for decreasing surface reflection therefrom, the said monolayers being superimposed to form a film having a thickness of about 1375 Angstrom units and being characterized by numerous voids of molecular magnitude whereby the refractive index of the film approximates the geometric mean between that of air and that of glass.

3. In combination, a glass body possessing utility by virtue of its ability to transmit light and a thin transparent coating of skeletonized cadmium arachidate on the body, the said coating having a thickness corresponding approximately to an odd number of quarter wave lengths of some component of light, whereby surface reflection from the body is substantially decreased.

4. The method of treating a transparent body to decrease surface reflection therefrom which comprises applying to such body a thin transparent solid film comprising two or more separable constituents and having a thickness corresponding approximately to an odd number of quarter wave lengths of some component of visible light, and thereafter selectively abstracting one of the constituents of the said substance to leave a molecular lattice of low refractive index.

5. The method of treating a transparent body for the purpose of decreasing surface reflection therefrom which comprises applying to the body a first monolayer of a transparent substance containing two or more separable constituents and having a refractive index on the order of that of the body, depositing on said first monolayer additional monolayers to produce a thin transparent film having an optical thickness corresponding approximately to an odd number of quarter wave lengths of some component of visible light, and thereafter selectively abstracting one of said separable constituents from the film so as to leave a molecular lattice having a refractive index between that of the body and that of air.

6. The method of treating a body of glass to minimize surface reflection therefrom which comprises applying to the body a monolayer of a substance which includes both a fatty acid and a soap of such fatty acid, applying additional monolayers of such substance to produce a thin transparent film having a thickness corresponding approximately to an odd number of quarter wave lengths of some component of visible light, and thereafter selectively dissolving out the fatty acid component of said film to leave a molecular lattice of low refractive index.

7. An optical system of the type in which light is caused to traverse successively a plurality of surfaces bounding a transparent medium such as glass or the like, wherein a thin stratified coating comprising a plurality of superimposed monolayers of a second transparent medium covers at least certain of the said surfaces, said coating having a thickness corresponding approximately to an odd number of quarter wave lengths of some component of light and there being numerous voids of molecular dimensions in the structure of the coating whereby its refractive index approximates the geometric mean between that of air and that of the first-named transparent medium.

KATHARINE B. BLODGETT.